United States Patent
Kuethe

[11] 3,776,363
[45] Dec. 4, 1973

[54] CONTROL OF NOISE AND INSTABILITIES IN JET ENGINES, COMPRESSORS, TURBINES, HEAT EXCHANGERS AND THE LIKE

[76] Inventor: Arnold M. Kuethe, 490 Barton North Dr., Ann Arbor, Mich. 48106

[22] Filed: May 10, 1971

[21] Appl. No.: 141,617

[52] U.S. Cl.......... 181/33 C, 181/33 HC, 181/33 P, 244/1 N, 244/41, 415/119, 416/235
[51] Int. Cl........................ F01d 5/16, B64c 23/06
[58] Field of Search............ 181/33 P, 36 A, 33 H, 181/33 HA, 33 HB, 33 HC, 33 HD, 43, 51, 33 C; 415/119, DIG. 1; 244/41, 1 N, 40 A; 416/500, 235, 228

[56] References Cited
UNITED STATES PATENTS

| | | | |
|---|---|---|---|
| 3,588,005 | 6/1971 | Rethorst | 244/41 |
| 2,934,889 | 5/1960 | Poulos | 181/33 HC |
| 3,191,377 | 6/1965 | Hiersch | 181/33 P |
| 2,650,752 | 9/1953 | Hoadley | 181/33 HB |
| 2,800,291 | 7/1957 | Stephens | 244/41 |
| 2,899,150 | 8/1959 | Ellis | 244/41 |
| 2,915,136 | 12/1959 | Ringleb | 181/33 HB |
| 2,944,623 | 7/1960 | Bodine | 181/33 HC |
| 3,000,401 | 9/1961 | Ringleb | 181/33 HB |
| 3,523,661 | 8/1970 | Rethorst | 244/41 |

FOREIGN PATENTS OR APPLICATIONS

| | | | |
|---|---|---|---|
| 587,211 | 1/1925 | France | 244/41 |
| 794,841 | 12/1935 | France | 244/41 |
| 1,487,398 | 5/1967 | France | 244/41 |
| 791,563 | 3/1958 | Great Britain | 244/41 |
| 885,093 | 12/1961 | Great Britain | 181/33 HC |
| 640,118 | 5/1962 | Italy | 244/41 |

Primary Examiner—Richard B. Wilkinson
Assistant Examiner—John F. Gonzales
Attorney—Marechal, Biebel, French & Bugg

[57] ABSTRACT

Intrinsic sound, noise and instabilities directly or indirectly due to the shedding of cross-stream vortices caused when air or fluid moves over the trailing edge of a plate, blade, vane or the like are reduced by the formation of relatively steady-state streamwise vortices upstream of the terminal edge. The invention is applied to turbine and compressor blades, jet tube inlets and exits, heat-exchanger tubes and the like by placing or forming streamwise vortex-inducing generators within the boundary layer on the shedding item so that the induced streamwise vortices trail off of the trailing edge and suppress the formation of cross-stream disturbances. Through this process, noise disturbances which would otherwise amplify to high sound intensitites and/or large flow disturbances, high structural stresses and loss of efficiency through passage over successive shedding items are suppressed in their early stages of development.

12 Claims, 7 Drawing Figures

PATENTED DEC 4 1973 3,776,363
SHEET 1 OF 2
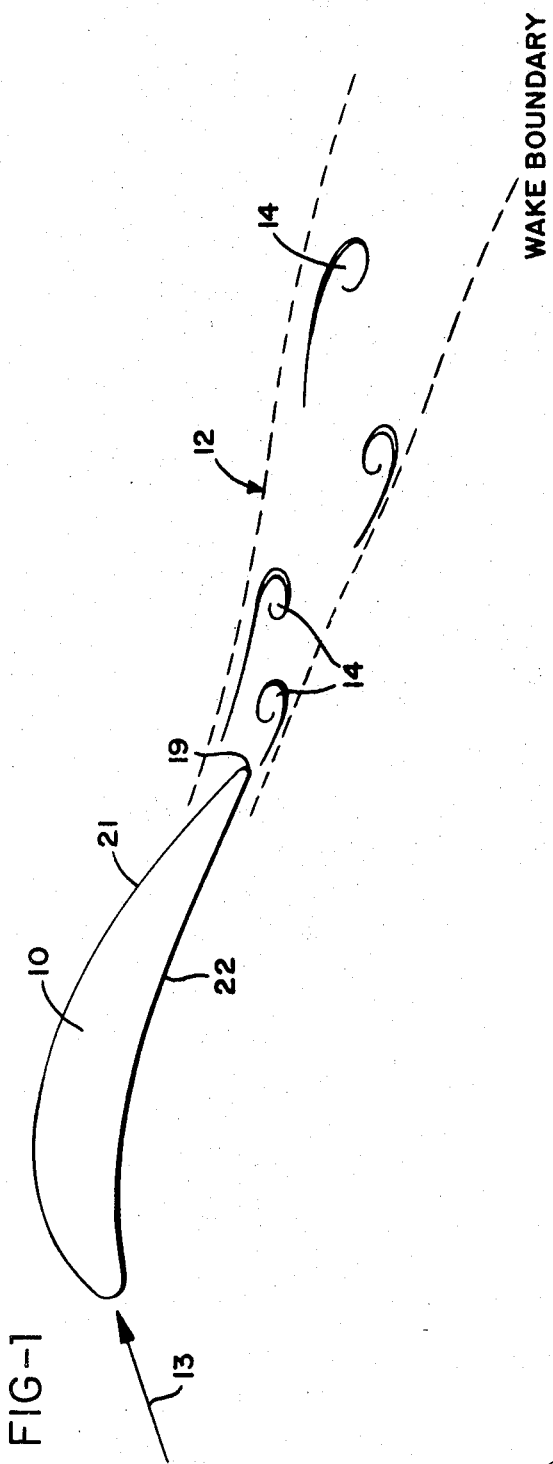
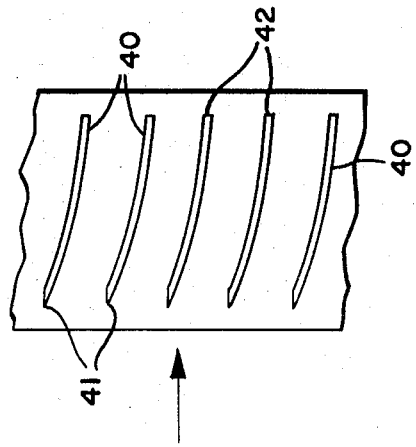
INVENTOR
ARNOLD M. KUETHE
BY
Marechal, Biebel, French & Bugg
ATTORNEYS

PATENTED DEC 4 1973 3,776,363

CONTROL OF NOISE AND INSTABILITIES IN JET ENGINES, COMPRESSORS, TURBINES, HEAT EXCHANGERS AND THE LIKE

BACKGROUND OF THE INVENTION

The present invention is directed to techniques, method and apparatus for the reduction of sound and flow instabilities produced in the wake of a body moving relatively through a fluid. It is known that when a fluid passes over a two-dimensional body, such as a blade, a surface of revolution of other surface which has a trailing edge aligned generally transversely to the direction of fluid flow, there is formed a cross-stream or transverse periodic succession of flow and pressure disturbances known as a Kármán wake or vortex trail. This is actually an alternating series of transverse vortices formed in the wake of the object. The Kármán trail produces sound by reason of the fact that the pressure disturbance varies with time; and often this sound is in the audible frequence range.

The sound produced by a single body in a low-speed fluid stream is of relatively small amplitude. However, the sound and the fluctuating structural stresses that accompany the generation of the Kármán trail at high speeds, such as occurs in flow past high speed propellers, fans, and helicopter blades and the like at near sonic and supersonic speeds, can be of significant amplitudes. Furthermore, the sound pressure is augmented when there are a large number of bodies moving, together, through a fluid stream. This is the condition which obtains, for example, in a jet engine in which sound is produced at the jet inlet, at the stator and rotor blades. Each individual trailing edge or blade produces a wake, and this wake includes a trail of cross-stream vortices. Since the blades are arranged in cascade fashion, the succeeding blade must pass through the wake created by the preceeding blade and this wake impingement creates additional noise. The disturbances due to Kármán vortices and that due to the passage of blades through the wakes of preceeding rotor and stator stages generate major contributions to the noise emitted by jet engines.

In addition, resonance characteristics of enclosures, such as fan or engine housings and heat exchangers, can cause the unsteady flow, vorticity or pressure disturbances, such as those described, to amplify by exchanging energy with each other and with the main stream. Instabilities in the functioning of turbines, compressors and heat exchangers and non-uniform temperature and flow properties, are frequent direct or indirect consequences of these energy transfers and resonance phenomena. This general problem has been described by Chen, "Flow-Induced Vibration and Noise in Tube-Bank Heat Exchangers Due to von Kármán Streets," *Journal of Engineering for Industry*, Feb. 1968, p. 134 et. seq. Jet engine noise is treated in a paper by Ribner Proc. Air Force Office of Scientific Research — University of Toronto Institute of Aerospace Sciences Symposium, May, 1968, University of Toronto.

SUMMARY OF THE INVENTION

The present invention is directed to methods and apparatus for suppressing the formation of Kármán vortices and to reducing flow disturbances in the wakes of bodies in relative motion through fluids. The invention has particular utility when applied in the form of streamwise vortex-inducing surfaces and elements in turbines, compressors, heat exchangers and the like. I have discovered that Kármán vortices can be suppressed by the formation of streamwise vortices upstream of the trailing edge in such a manner that the streamwise vortices trail off from the edge and into the wake region. I prefer to form the streamwise vortices by using vortex-inducing surface discontinuities or surface elements positioned within the boundary layer a short distance upstream of the trailing edge at which Kármán shedding occurs. The streamwise vortex theoretically produces no sound since it is essentially a steady-state phenomenon in that there is no pressure change with time. Thus, by forming streamwise vortices and in doing so, suppressing the formation of Kármán vortices, I can substantially reduce the sound which would otherwise be caused by the same structure in the absence of my invention.

I prefer to create the streamwise vortices by utilizing vortex-producing elements, within the boundary layer, of the type disclosed in my U.S. Pat. No. 3,578,264, now scheduled to issue May 11, 1971 (also disclosed in German Offenlegungsschrift No. 1934246). The vortex-producing elements may thus comprise either a discrete raised portion or a depression, aligned to intercept the flow of fluid or air and to cause a transfer of streamwise momentum from the exterior flow to the boundary layer immediately adjacent the surface in question. Such vortex generating elements may be formed or placed on one side or on both sides of the surface in question, such as adjacent the trailing edge of a blade, jet mouth or the like. More complete suppression of the Kármán trail is achieved by using vortex generators on both surfaces leading to the trailing edge. The elements may be either curved or straight, and are preferably inclined at an acute angle to the direction of air flow for maximum utilization of the boundary layer vorticity.

It is accordingly an important object of this invention to provide apparatus and method for reducing the sound emitted by, and the flow instabilities within, compressors, turbines, heat exchangers and the like.

A further important object of the invention is the suppression of a trail of cross-stream sound-inducing vortices by the creation of an array of streamwise vortices upstream of the trailing edge or flow separation line.

A further object of the invention is the provision of a jet engine, or a compressor, a turbine or a heat exchanger having improved sound emission characteristics.

A still further object of the invention is that of the elimination or reduction of the intensity of cross-stream vortices by the formation of streamwise vortices within the boundary layer.

These and other objects and advantages of the invention will be apparent from the following description, the accompanying drawings and the appended claims.

BRIEF DESCRIPTION OF THE DRAWINGS

FIG. 1 is a diagram of an airfoil element, such as a compressor or turbine blade, diagrammatically illustrating the formation of Kármán vortices at the trailing edge;

FIG. 3 is a diagram of a streamwise vortex pattern formed by this invention;

FIG. 7 is a modification showing a curved vortex generator.

DESCRIPTION OF PREFERRED EMBODIMENT

Figure 2:
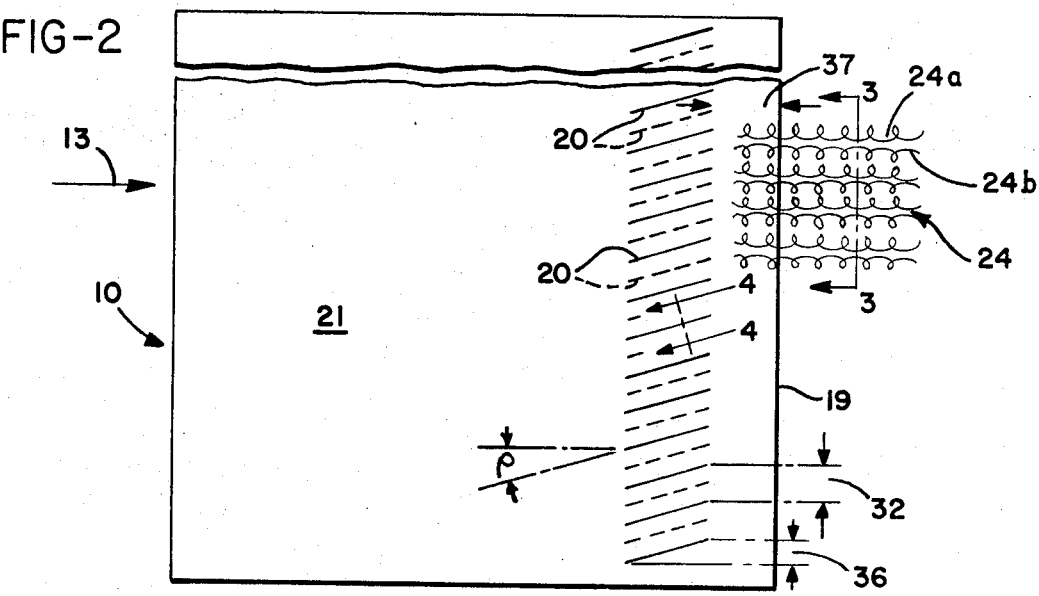
FIG. 2 is a fragmentary plan view of a blade of FIG. 1 to which my technique has been applied.

Referring first to FIG. 1, a two-dimensional object of an air stream, in the form of an airfoil-shaped turbine or compressor blader 10 is shown creating an instable wake 12 of Kármán-type vortices, with air flowing in the direction of the arrow 13. Actually, such as instability wake may be produced by any transversely elongated object in a moving stream. The cross-stream vortices of alternating opposite sign within the wake 12 are diagrammatically illustrated at 14. The formation of cross-stream vortices is referred to as "shedding." The frequency n by which vortices are shed from the trailing surfaces of a flat plate parallel to a fluid stream may be given by the formula:

$$n = 0.27v/t+o \cdot 6\delta$$

where $v$ is the velocity of the mainstream air, $t$ is the thickness of the object at the trailing edge, and $\delta$ is the boundary layer thickness.

While the specific application of this invention is illustrated herein as applied to a typical turbine blade 10, the method can be applied for example, either to a rotor or to a stator blade, either in the compressor or the turbine section, and it should be understood that the invention is not intended to be limited to its application tp jet engine blades as such. In fact, the advantages of the invention can be realized by applying it to jet tube exits or other surfaces adjacent terminal or trailing transverse edges in order to suppress or reduce the formation of cross-stream vortices.

From the above formula, it will be seen that even a sharp trailing edge will produce a Kármán vortex trail. Further, the shedding frequency $n$ for a conventional turbine blade, particularly if it is highly loaded, will be lower because flow separation from the suction (convex) surface will take place slightly upstream of the trailing edge, thus resulting in an effective thickness $t$ greater than that of a corresponding flat plate. Shedding frequencies in the order of 5,000 to 10,000 cps can be expected.

I achieve the suppression of the Kármán vortex trail by creating at a region upstream of the trailing edge 19, a transverse series of streamwise vortices which trail off the edge 19 (or the flow separation line) and into the region of the wake boundary 12. Such streamwise vortices are preferably formed by suitable vortex generating elements 20, positioned on both the upper and lower surfaces 21 and 22 of the sound producing element, although it is within the scope of my invention to utilize generators selectively on either of such surfaces or alternatively on such surfaces.

Figure 4:
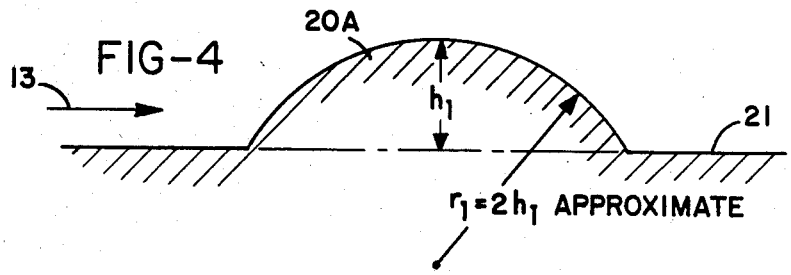
FIG. 4 is a fragmentary enlarged section through a positive surface element taken generally along the line 4—4 of FIG. 2.
Figure 5:
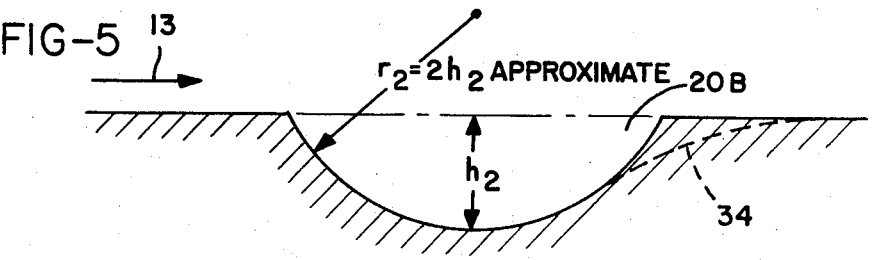
FIG. 5 is a similar section through a negative surface element.

The generators 20 are preferably constructed according to the teachings of U.S. Pat. No. 3,578,264, above referred to, and thus consist of surface elements of either the positive or negative type applied to or formed on the exposed surface 21 or 22 of the blade 10, and which extend partially into the boundary layer as defined or measured at a region upstream of the surface elements. The vortex-producing elements or generators 20 are shown in FIG. 2 as being applied to both the upper and lower surfaces of the blade 10 adjacent the trailing edge 19. The generators 20 shown in full line are applied to surface 21 and those shown in broken line are applied to the opposite surface 22. The elements 20 may thus be formed either integrally with the surface of the blade or may be applied to the surface. They may be positive as shown in FIG. 4 or negative as shown in FIG. 5, and preferably extend in an array of elements 20 along straight transverse regions and are oriented generally parallel to each other. FIG. 2 illustrates such an array in which all of the elements 20 are parallel to each other. However, V-shaped or zig-zag element arrays as disclosed in U.S. Pat. No. 3,578,264 may also be used.

The placement of the vortex generating or inducing elements with respect to the airfoil surface of the blade 10 differs somewhat from conventional placement of vortex-producing devices which are used for delaying flow separation. In the latter case, the vortex generators are commonly placed nearer the center of the chord length of the blade or airfoil structure in question. However, for the purpose of suppressing the Kármán trail, I have found it desirable to place the vortex-inducing elements nearer to the trailing edge or the flow separation line. Also, my method as it relates to noise suppression is not limited to the use of vortex-including elements on airfoil or curved sections since this technique and method may be applied to flat plates, or surfaces which are not curved in the direction of fluid flow, such as the region adjacent exit ducts, or wherever there is a terminal edge in a mainstream of flow, for suppressing the shedding of transverse vortices. Further, my invention is not limited specifically to the use of the boundary layer vortex generator as disclosed in U.S. Pat. No. 3,578,264, and generators of the conventional type as shown in U.S. Pat. Nos. 2,800,291 and 2,558,816 may be used. However, I prefer to employ the boundary layer vortex generator because of its small dimensions, low cost, ruggedness and simple surface configuration.

Figure 6:
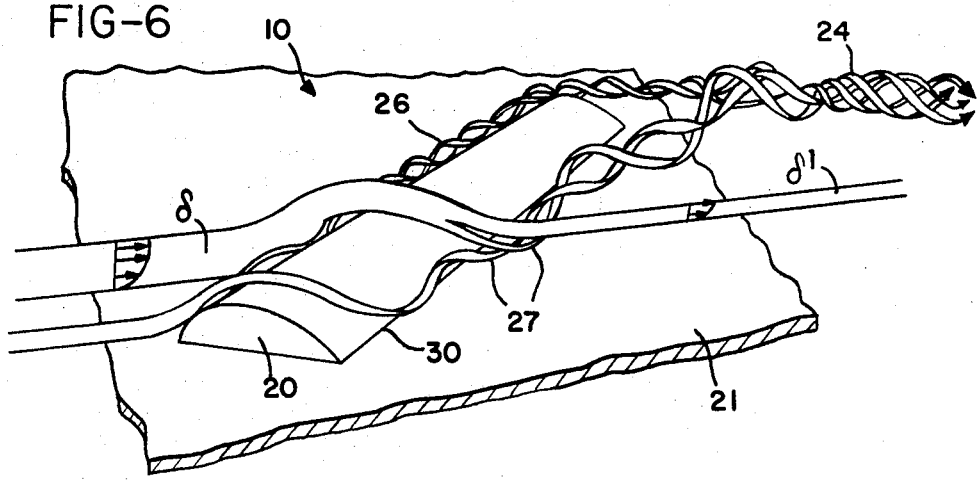
FIG. 6 is a diagrammatic representation showing the manner in which a single surface element forms a streamwise vortex.

The mechanism by which a given streamwise vortex is generated by a surface element inclined at an angle to the direction of mainstream flow does not admit of precise graphic analysis. FIG. 6 is an illustration of a typical single generator 20 shown as being applied to the exposed surface of a blade 10 or the like. The boundary layer vorticity is deflected to form, in this instance, a vortex 24 having a counter-clockwise rotation as viewed oppositely to the direction travel of the mainstream air. It will be seen that some of the streamlines 26 are diverted by the leading edge of the element 20 and are displaced laterally along the edge and trail off at the trailing edge of the element and are joined by some of the streamlines 27 which pass over the element and are deflected and caused to rotate in the streamwise direction to form the vortex 24. This may or may not be accompanied by a reversal of flow of the flow component normal to the axis of generator 20 in the region close to its downstream edge 30. In all cases, the streamlines closest to the surface at the downstream edge 30 of the generator 20 are deflected to a greater extent than the streamlines in the boundary layer more remote from the surface. Reference may be had to U.S. Pat. No. 3,578,264 for a fuller discussion of the mechanics of streamwise vortex formation by a generator element 20. The diagram of FIG. 6 further illustrates the manner in which the thickness of the boundary layer $\delta$ has been decreased as indicated by $\delta'$.

Observations by vorticity meters have shown that two adjacent generators 20, having the same relative inclination with respect to the mainstream flow, will each produce a primary vortex 24 rotating in the predicted direction, and if the spanwise spacing 32 between the generators is near optimum, they will also produce therebetween a secondary vortex rotating in the opposite direction. Thus, referring to FIGS. 2 and 3, the individual generators 20 on the upper surface will produce a corresponding transverse series of primary vortices indicating generally at 24a which rotate in the same direction as shown in FIG. 3. The primary vortices 24 also produce intermediate secondary, relatively counter-rotating vortices as indicated at 24b in FIG. 3.

The mechanism of the formation of the vortices 24b may be understood by looking at FIG. 3. The downward motion of the fluid indicated at 33 and the upward motion indicated at 34 set up a motion between them which induces the formation of the vortex 24b in the space between the adjacent co-rotating vortices. Vorticity meter observations indicate that the counter-rotating intermediate vortex 24b is of substantially the same intensity of that of a primary vortex 24a. This tends to show the completeness by which the boundary layer vorticity has been utilized by the generator arrays in the production of steady-state streamwise vortices for the suppression of the formation of the Kármán cross-stream vortex trail.

The mechanism by which my invention suppresses the Kármán vortices can best be understood by considering the details of the flow near the line where the flow separates from the body; on an airfoil-shaped body, this line is very near the trailing edge 19. In a two-dimensional flow, that is, in the absence of a spanwise velocity component, a flow instability occurs which causes the separation line to shift back and forth as Kármán vortices form and are shed into the wake. The effect of the streamwise vortices generated by my invention is to provide a strong spanwise velocity component at the separation line with the resulting tendency to stabilize the flow in that region and prevent the generation of Kármán vortices. This tendency is accentuated if the streamwise vortices are of alternating sense so that the spanwise velocity components alternate as one moves along the separation line and there would thus be no sufficiently long spanwise interval in near two-dimensional flow to generate the Kármán vortices.

As indicated above, I prefer to employ an array of vortex generators 20 on each of the two opposite surfaces of the object with respect to which suppression of transverse vortices is desired. In the embodiment of the turbine blade 10 shown in FIG. 2, an array of the generators 20 is shown as being formed on the top surfaces and another array is formed on the bottom surface, in generally the same region as the top array and having the same relative inclination when viewed from the same side. In a turbine blade, the surfaces are respectively known as pressure and suction surfaces. However, the cross-stream spacing of the generators on the pressure side, for example, are staggered with respect to that of the generators on the suction side. The result is that a primary vortex 24a from one surface will flow from the trailing edge at the same region as a secondary vortex 24b from generators on the opposite surface. The rotations of these pairs of vortices 24a and 24b from opposite surfaces are in the same direction, and thus the arrangement is one in which the vortices formed by the generators on the opposite surfaces tend to augment and reinforce each other at a region downstream of the trailing edge 19.

While the spacing number, length, height (or depth) and angle of the inclination of the generators 20 may vary widely, I have found that good results are obtained when the ratio of generator height $h_1$ (or depth $h_2$) to boundary layer thickness $\delta$ is in the order of 0.5, as shown in FIGS. 4 and 5. In the embodiment of FIG. 5, it may be desired to round out the downstream edge as shown at 34. The ratio of generator length to boundary layer thickness can be in the order of 8, and the angle of inclination $\rho$ to the mainstream 13 may be in the order of 15°. Further, the ratio of cross-stream projection 36 (generator length multiplied by sin $\rho$) to the cross-stream spacing 32 may be in the order of 0.5, and the spacing 37 upstream of the trailing edge 19 or the flow separation line in the order of approximately 15 times the upstream boundary layer thickness or less. As noted, these dimensional ratios are not critical; however, if the distance of the generator from the trailing edge is too great, the generated vortices may be damped by viscous dissipation, thus reducing their effectiveness in suppressing the cross-stream vortices.

While I prefer to use generators 20 formed along generally straight lines as shown in FIG. 2, these generators need not be straight and may in fact be curved as shown at 40 in FIG. 6 with an upstream end 41 at an angle $\rho$ of 15°—20° and the downstream end 42 substantially parallel to the flow direction with the shape approximately the arc of a circle.

It will thus be seen that one of the important advantages is the provision of an apparatus and method by which the sound producing instability of elements moving through a fluid stream, such as air, can be reduced with a minimum of alteration to these elements and at a low cost. The generators are not subject to misalignment in use or easy destruction. They have an exceedingly low profile and thus do not require a major change in design or the spacing of the parts, which could be critical in a jet engine for example. Further, the reduction of noise by the suppression of the noise producing cross-stream vortices is in itself a measure of increased efficiency. When my method is applied to the quieting of a jet engine, it is preferred that the generators be applied to the blades of both the compressor and the turbine, and to substantially all of these blades. Further, the elements may be similarly applied to the inside and outside surfaces of the jet exit mouth to reduce shedding, and to the surfaces of tube-bank heat exchangers to reduce flow-induced noise and vibration.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention.

What is claimed is:

1. The method of reducing noise and vibration inducing Karman vortices at the trailing edge of a turbine blade or vane in a jet engine or the like comprising the step of forming a spanwise series of streamwise vortices at locations on the surface of the blade or vane upstream of the trailing edge thereof and no higher than the height of the boundary layer so that said vortices flow past said trailing edge and downstream thereof to provide an increase spanwise flow component at said trailing edge.

2. The method of claim 1 in which said streamwise vortices are formed by positioning elongated wave elements on said surface at an acute angle to the direction of flow thereover.

3. A jet engine, turbine or compressor blade element having reduced sound producing characteristics in which a curved flow control surface terminates at a cross-stream trailing edge, the improvement comprising means defining at least one elongated vortex producing element on said surface positioned slightly upstream of said trailing edge at an acute angle to the direction of flow over said surface and situated entirely within the boundary layer air effective to produce a streamise vortex extending off said trailing edge and into the region normally occupied by Kármán cross-stream vortices.

4. The blade of claim 3 further comprising a plurality of said elements positioned in a spanwise row adjacent said trailing edge.

5. The blade of claim 4 in which said elements are formed on each of the pressure and suction surfaces of said blade adjacent said trailing edge.

6. The method of suppressing the shedding of noise or vibration-producing cross-stream unsteady vortices which are otherwise produced downstream of the flow separation line of a body such as a tube, duct, turbine blade or vane, in a fluid stream comprising the steps of forming wholly within the boundary layer a plurality of spanwise-separated primary streamwise relatively steady-state vortices at locations adjacent the surface of said body upstream of the separation line, simultaneously inducing the formation of a plurality of counter-rotating streamwise vortices intermediate said primary vortices, and causing said streamwise vortices to extend downstream of such separation line into the downstream region normally occupied by cross-stream vortices to effect a spanwise velocity component at the flow separation line for the suppression of the shedding of cross-stream vortices.

7. The method of claim 6 in which said streamwise primary vortices are formed by elongated waves elements on said surface positioned at an acute angle to the direction of flow of said fluid stream.

8. In a jet engine having compressor and turbine blades, the improvement in jet engine structure reducing intrinsic sound emission therefrom, comprising means on the surface of a substantial number of said blades defining elongated vortex-producing elements, said elements being elongated in the streamwise sense, positioned wholly within the boundary layer upstream of the trailing edge of said blades and extending at an acute angle to the direction of air flow over the blade surface to produce streamwise, relatively steady-state vortices extending rearwardly of the corresponding trailing edges to suppress the formation of sound-producing cross-stream pressure disturbances behind said blades.

9. A body in a relatively moving fluid stream having a reduced tendency for producing noise and vibrations and having a surface exposed to said stream terminating in a terminal edge or a flow separation region, comprising means on said surface upstream of said edge or region defining a spanwise series of elongated surface elements positioned wholly within the fluid stream boundary layer and extending at an acute angle to the direction of flow of said fluid stream and which utilize the boundary layer vorticity to form a plurality of streamwise vortices in said fluid stream which trail downstream of said edge or region and which induce spanwise components of flow to suppress the formation of noise and vibration-inducing Kármán vortices.

10. The body of claim 9 having opposed said surfaces which effectively terminate at a common edge defining said terminal edge or region, and said vortex-forming elements being associated with each of said surfaces.

11. The body of claim 10 in which the vortex-forming means on said surfaces are related in spanwise spacing to each other to form mutually reinforcing vortices downstream of said edge.

12. The body of claim 9 in which the spacing between adjacent spanwise said elements is sufficient to induce the formation of a counter-rotating vortex between an adjacent pair of primary element-inducing vortices.

* * * * *